United States Patent [19]
Fitzner

[11] 3,805,759
[45] Apr. 23, 1974

[54] IGNITION SYSTEM WITH ADVANCE STABILIZING MEANS

[75] Inventor: Arthur O. Fitzner, Fond Du Lac, Wis.

[73] Assignee: Brunswick Corporation, Chicago, Ill.

[22] Filed: Nov. 23, 1971

[21] Appl. No.: 201,457

[52] U.S. Cl. ....... 123/177 R, 123/148 E, 123/149 D
[51] Int. Cl. .............................................. F02p 5/08
[58] Field of Search ............ 123/148 E, 117, 117 A; 322/91; 310/70 A; 315/209, 218

[56] References Cited
UNITED STATES PATENTS
3,653,367  12/1969  Oishi .............................. 123/148 E
3,566,188  2/1971   Minks ......................... 123/148 E X

*Primary Examiner*—Laurence M. Goodridge
*Attorney, Agent, or Firm*—Andrus, Sceales, Starke & Sawall

[57] ABSTRACT

A multiple magnet flywheel alternator is connected to charge a capacitor of a capacitor discharge ignition system. The capacitor is discharged to the several spark plugs of an internal combustion engine by individual controlled rectifiers having the gates connected to a separate pulse generator establishing trigger pulses of an amplitude varying with speed. A self-generating reverse voltage bias network includes a parallel capacitor and resistor connected in series with the output of the generator and the triggering circuits.

14 Claims, 4 Drawing Figures

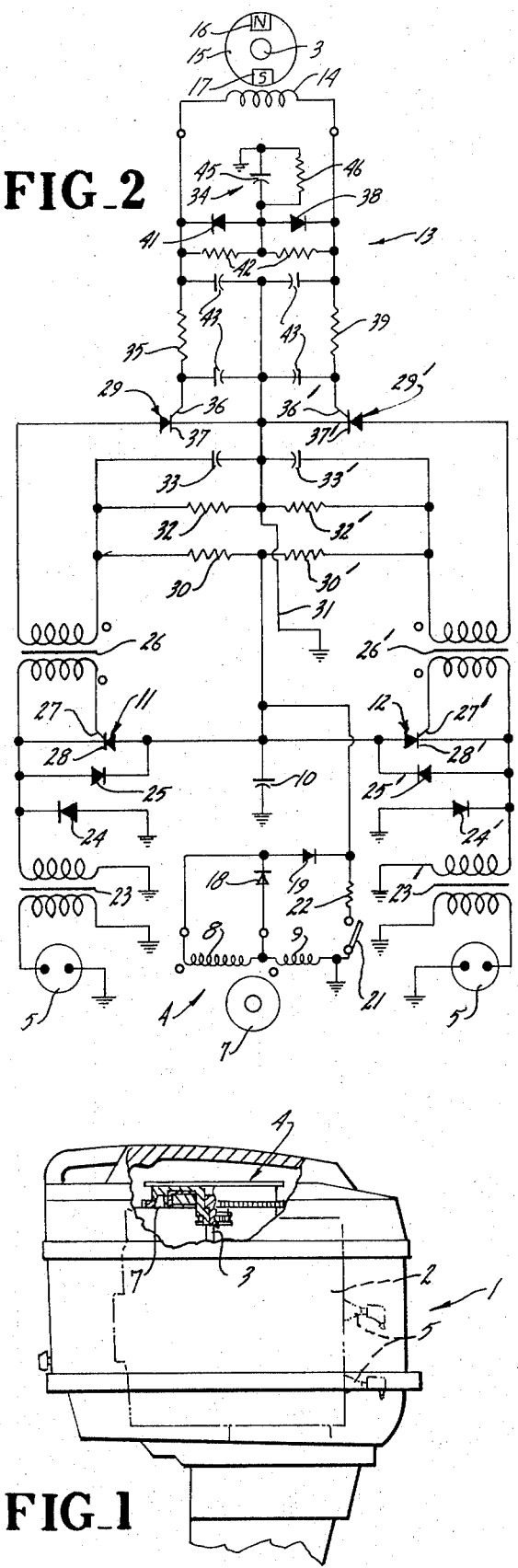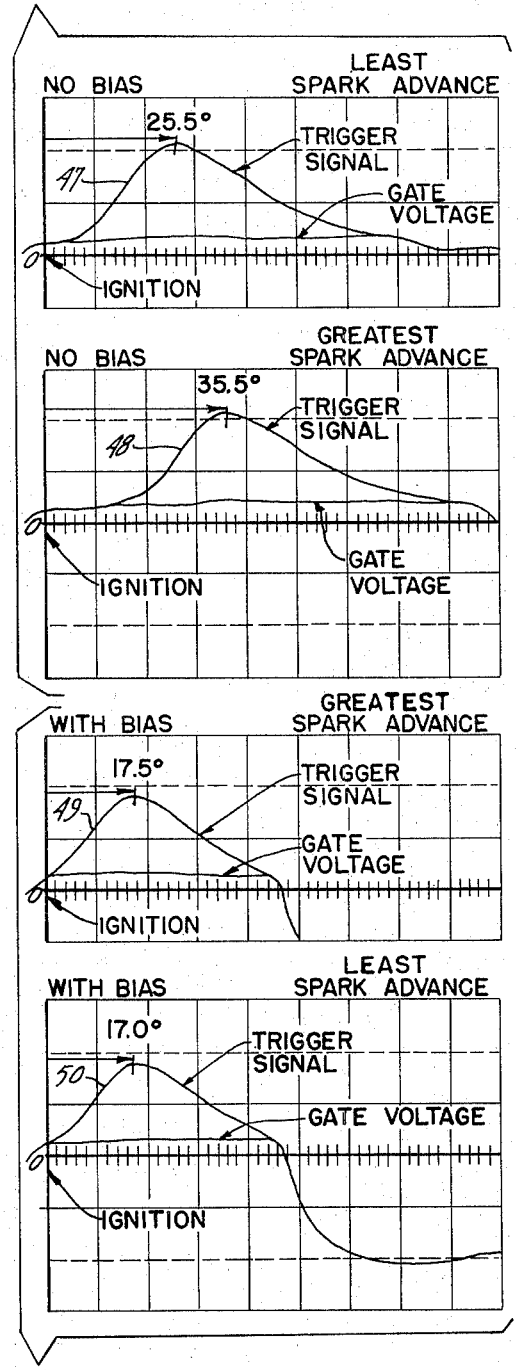

IGNITION SYSTEM WITH ADVANCE STABILIZING MEANS

BACKGROUND OF THE INVENTION

This invention relates to an alternator driven capacitor discharge ignition system and particularly to such a system employing means to stabilize the firing of the spark plugs with respect to the desired firing point.

Capacitor discharge ignition systems have been recently developed to provide improved ignition in internal combustion engines and the like. The capacitor discharge ignition systems may employ a battery power supply in combination with a DC to DC converter for charging of the capacitor to the firing level or alternatively may employ an alternator coupled to and driven with the flywheel to produce an alternating current output which is rectified and applied to charge the capacitor. Although both systems have been developed, the alternator driven system has some advantages from the standpoint of economy. For example, a highly satisfactory system is shown in U.S. Pat. No. 3,566,188 which issued Feb. 23, 1971 to Floyd M. Minks on TRIGGERED IGNITION SYSTEM. As more fully disclosed therein the alternator rectifier unit is connected to simultaneously charge a main firing capacitor and a triggerig capacitor. The output of the main firing capacitor is connected through individual firing circuits for a pair of spark plugs with the triggering capacitor selectively being interconnected to complete the alternate circuits through individual pulse forming triggered circuits. Each of the triggered circuits in turn includes a controlled rectifier connected to a separate pulse generating unit for alternately firing of the rectifier to conduct and thereby providing for transfer of the energy from the main firing capacitor to the pair of spark plugs. Although the circuit provides a highly satisfactory ignition system it was found that the circuit ignition timing varied with engine speed. The present inventor discovered that the ignition system displayed an undesirable spark advance with increasing engine speed in the range of a total of twenty degrees maximum. Although such an amount of spark advance is not excessive, the advance results from engine speed rather than the setting of the spark advance lever. This, in turn, was recognized by the inventor as a possible source of engine speed instability. Further, at least part of the total advance included relatively significant step-type changes in timing as the engine slowly accelerated through selected portions of the speed range and as the spark advance lever was slowly moved through its various settings. The changes in turn varied at different engine speeds. As the result of the above, the correlation between the ignition timing and the setting of the spark advance lever was not predictable.

SUMMARY OF THE PRESENT INVENTION

The present invention is particularly directed to a relatively simple and inexpensive circuit connection for eliminating the undesirable spark advance exhibited in the previous circuit. Generally, in accordance with the present invention, a self-generating bias network is interconnected with the triggering circuit to control the circuit operation with varying engine speeds to particularly prevent the undesired spark advance. Thus, Applicant realized that the source of difficulty encountered generally related to the particular circuit employing controlled rectifiers and the like wherein the actuation or firing of the discharge circuit is dependent upon the variable output of a trigger pick-up coil in relationship to a relatively constant gate or threshold voltage for triggering of a controlled rectifier or the like. Thus, Applicant realized that the trigger signal itself is highly variable and changes from a relatively weak signal at low speeds to a very high signal at high speeds. Although the output is adequate to trigger a controlled rectifier or the like, the combination of the variable trigger signal feeding into the constant threshold gate level for a controlled rectifier contributed to an undesirable spark advance with speed.

Further, the multiple magnet flywheel alternator generated undesirable ripple voltages which also increase in strength as the speed of rotation of the engine and the associated flywheel increases. This caused the trigger signal to prematurely exceed the threshold voltage level with a sudden jump or step change in timing with the slowly increasing speed. Further, where an even number of pairs of flywheel magnets are employed the ripple frequency is an even multiple of the frequency of the triggering voltage. This is an even harmonic relationship and consequently the ripple voltage effect changes with respect to a pair of cylinders in a dual cylinder unit. As a result there will be a degrading in the desired 180° timing between the two cylinders.

Applicant has found that such undesirable characteristics can be eliminated by creating a variable threshold voltage approximately matched to the variable trigger signal strength. Thus, at low speeds when the trigger signal is low, a low bias signal is introduced and, consequently, has little or no effect on the ignition timing. As the rotational engine speed increases with the generation of a relatively strong trigger signal, the self-generating bias circuit introduces a corresponding larger or opposing bias which must be overcome by the trigger signal. Applicant has found that an opposing bias network effectively neutralized any change in the timing such as heretofore encountered. Further, there is, of course, essentially no sudden large timing jump such as occurred with a slow change in the spark lever position or increasing speed, or at most may be made to appear only as a relatively insignificant one-half degree jump in a practical outboard motor in the speed range of from 4,000 to 6,000 revolutions per minute. As a result, the correlation between the ignition timing and the setting of the spark advance level is established and the 180° timing relationship between the two cylinders is maintained stable for all speeds.

Generally, in accordance with a particularly novel construction of the present invention, a self-generating bias network includes a parallel capacitor and resistor connected in series with the output of the pulse generator and both of the triggering circuits. Applicant has found that this particular series circuit connection provides reliable and responsive self-generating bias control which will stabilize the relationship between the trigger voltage generated and the required firing voltage for initiating discharge of a main firing capacitor.

BRIEF DESCRIPTION OF DRAWING

The drawing furnished herewith illustrates a preferred construction of the present invention in which the above advantages and features are clearly disclosed as well as others which will be readily understood from the description of the illustrated embodiment.

In the drawing:

FIG. 1 is a simplified view of an outboard motor with parts broken away to generally show inner details of construction;

FIG. 2 is a diagrammatic circuit diagram of an alternator driven capacitor discharge ignition system and being incorporated in the outboard unit of FIG. 1 and clearly illustrating the present invention;

FIG. 3 is a graphical illustration of an undesirable timing advance encountered in an ignition system such as shown in FIG. 2 without applicant's invention; and FIG. 4 is an illustraton of a corresponding ignition system with applicant's invention as shown in FIG. 2.

DESCRIPTION OF THE ILLUSTRATED EMBODIMENT

Referring to the drawing anc particularly to FIG. 1, an outboard motor unit 1 is shown having an internal combustion two cylinder engine 2 mounted as a part of the power head unit. The illustrated engine is a two cylinder unit having a vertically disposed crank or drive shaft 3 connected to drive the lower propeller assembly and further coupled to drive a flywheel alternator unit 4. The output of the alternator unit 4 is interconnected to supply energy to a capacitor discharge ignition system as shown in FIG. 2 for selective firing of a pair of spark plugs 5 associated with the respective cylinders. The flywheel alternator unit 4 includes a multiple pole rotor 7 secured to the engine flywheel. The rotor is a multiple pole unit with successive poles sequentially coupled to a low speed winding 8 and a high speed winding 9, shown in FIG. 2, which are connected as more fully disclosed inthe previously referred to patent to charge a main firing capacitor 10. The output of the capacitor 10 is connected to alternately fire the spark plugs 5, through selective firing of a pair of related controlled rectifiers 11 and 12 respectively. A trigger circuit 13 includes a trigger coil or winding 14 actuated from a separate rotor 15 having a pair of oppositely polarized magnets 16 and 17 spaced by 180° to define a pulse generator. Rotor 15 is coupled to the shaft 3 and generates a pair of trigger pulses of opposite polarity for each 360° rotation of the crankshaft 3, with the pulses spaced 180°.

In summary the outputs of the windings 8 and 9 charge the capacitor 10 to a desired voltage. The triggering coil 14 is mounted in relation to the rotor 15 to permit adequate charging of capacitor 10 which is established in less than 180° rotation. The triggering coil 14 establishes a trigger impulse current or voltage to trigger controlled rectifiers 11 or 12 into conduction and thereby provide for the discharge of the capacitor 10 and the sequential and timed firing of the related spark plugs 5.

More particularly, outputs of the windings 8 and 9 are connected through a pair of rectifying diodes 18 and 19 to charge the capacitor 10 during an appropriate half-revolution of the crankshaft. In addition, an ignition or kill switch 21 connects the top side of the capacitor 10 to ground through a resistor 22.

The output of the capacitor 10 is similarly connected to the spark plugs 5 through similar parallel circuits. The circuit to the one spark plug 5 via the controlled rectifier 11 is described in detail with corresponding elements associated with the second spark plug 5 identified by the corresponding prime numbers.

A pulse transformer 23 interconnects the first spark plug 5 to the discharge circuit of the capacitor 10. A diode 24 is connected in parallel with the primary of the transformer 23 to improve the discharge operation. Similarly, a reverse shunting diode 25 is connected in parallel with the silicon controlled rectifier 11.

The controlled rectifier 11 is connected to the trigger circuit 13 via a step down transformer 26 having the appropriate side of the output of the transformer secondary connected to a gate 27 and the opposite side connected to tbe cathode 28. When the output of tbe transformer 26 is such as to drive the gate 27 sufficiently positive, the controlled rectifier 11 is triggered into conduction and rapidly discharges the capacitor 10 through the pulse transformer 23 to fire the one spark plug 5.

One-half engine revolution later, the controlled rectifier 12 is correspondingly actuated to discharge the capacitor 10 via the transformer 23' to fire the second spark plug 5. Between the firing pulses the capacitor 10, of course, is recharged.

The pulse transformers 26 and 26' are connected to generate pulses through selective connection of tbe output of the separate triggering circuits, preferably employing pilot or auxiliary controlled rectifiers 29 and 29', respectively, which, in turn, are selectively alternately fired by the output of the coil 14. Thus the capacitor 10 has the side connected to the alternator unit 4 also connected in series with a resistor 30 to the one side of the primary transformer 26, the opposite side of which is connected in series with the controlled rectifier 29 back to a common ground lead 31. A resistor 32 in parallel with an auxiliary or trigger power capacitor 33 is connected in series with resistor 30 to ground and thus also in parallel with the transformer 26 and the controlled recitifer 29. Alternator unit 4 charges capacitor 10 which, in turn, then supplies the power via resistor 30 to charge capacitor 33. When the controlled rectifier 29 is biased to conduct, the capacitor 33 discharges and provides a current pulse through the primary of the transformer 26 and the controlled rectifier 29 to ground, such as shown in issued U.S. Pat. No. 3,566,188. The induced secondary current in transformer 26 is of such polarity as to trigger, by means of gate 27, main controlled rectifier 11 into conduction and thereby provide a direct circuit connection of the capacitor 10 to the pulse transformer 23 to discharge substantially all of the power of the capacitor 10 into the one spark plug 5. During the next 180° rotation of rotor 15, the controlled rectifier 29' is triggered to provide a corresponding discharge of the capacitor 33' into the pulse transformer 26' to thereby trigger conrolled rectifier 12 and provide for discharge of the capacitor 10 through the pulse transformer 23' for firing of the second spark plug 5.

The triggering circuit, in accordance with the teaching of the present invention, includes a biasing network 34 interconnected with the coil 14 and the gates 36, 36' which define a conduction control means of the respective controlled rectifiers 29 and 29'. In particular in the illustrated embodiment of the invention, the one side of the coil 14 is connected in series with a resistor 35 to the gate 36 of controlled rectifier 29. The cathode 37 of controlled rectifier 29 is connected to ground lead 31 and thence through biasing network 34 and return diode 38 to the opposite side of the coil 14, shown to the right side in FIG. 2. Thus, when the left side of the coil 14 is positive, a current path through the gate to cathode circuit of controlled rectifier 29 is provided to fire controlled rectifier 29 and thereby provide for the discharge of the capacitor 33 as previously described.

When the polarity is reversed, such that the right side of coil 14 is positive, the current path is established to fire controlled rectifier 29'. Thus the right side of the coil 14 is connected in series with a resistor 39 to the gate 36' of the controlled rectifier 29'. The cathode 37' of the controlled rectifier 29' is connected to the ground lead 31 and then through the self-bias network 34 and a diode 41 to the left side of the coil 14. The bias transmission resistors 42 are connected in parallel with the diodes 38 and 41 and high frequency by-pass capacitors 43 connect the opposite sides of the gate resistors 35 and 39 to ground to suppress stray signal pick-up.

The spaced magnets 16 and 17 of rotor 15 induce the alternate polarity pulses for sequential and alternate firing of the spark plugs 5. This provides for the alternate firing of the controlled rectifiers 29 and 29' with the desired discharge of the capacitor 10 to fire spark plugs 5 alternately.

Thus, during each 360° rotation of the rotor 15 of the pulse generator means opposite polarity and time spaced pulses are generated in the coil 14 to trigger the controlled rectifiers 29 and 29'. Each pulse signal is transmitted as a rectified current signal with respect to the bias network 34 as a result of the diodes 38 and 41 and the diode-like characteristics of the gate-cathode junction of controlled rectifiers 29, 29'.

The self-biasing network 34 includes a bias capacitor 45 in parallel with a bleeder resistor 46. The capacitor 45 is a relatively large capacitor but need only be of a relatively low voltage rating. Applicant has satisfactorily employed a 33 microfarad capacitor with a 15 volt rating. The parallel bleeder resistor 46 can conveniently be one and one-half thousand ohms to provide for timed discharge of the capacitor 45. The bleeder resistor 46 must be able to reduce the bias at a faster rate than the rate at which the amplitude of the pulses induced in coil 14 can be reduced by slowing down of engine speed, so that at no time can the bias voltage prevent triggering entirely.

The capacitor 45 is charged by each trigger pulse to establish a negative back bias voltage with respect to the ground 31. During the time interval between pulses from coil 14, during which interval neither diode 38 nor diode 41 is conducting, the negative back bias voltage is applied to resistors 35 and 39 through the bias transmission resistors 42, and thus provides a back bias on the gates 36 and 36' of the controlled rectifiers 29 and 29'. The level of the voltage is, of course, directly related to speed of rotation of rotor 15 and increases with speed as a result of the reduced discharge time between pulses and the increased amplitude of the trigger signals. Network 34 thus generates a variable threshold voltage which approximately matches the strength of the variable trigger signal generated by the source means. Thus, at low speeds, the bias generated is relatively low as the result of the relatively small trigger signals and the long discharge time between the generated signal pulses. As a result the bias circuit has little effect on the ignition timing. At high speeds however the trigger signals have a higher amplitude and a high repetition rate, which result in relatively large negative bias voltage on the capacitor 45. This relatively high level signal must be overcome by the high trigger signal. Applicant has found that this variable threshold bias results in unusual stabilized operation of the circuit. As previously noted the self-biasing network has essentially eliminated the large advance in timing and the sudden step changes with speed heretofore encountered. Further, the correlation between the ignition timing and the spark advance lever setting as well as the 180° timing relationship between pairs of cylinders are accurately maintained over all normal operating speeds.

For example, referring particularly to FIGS. 3 and 4, the variation in the advance at a given speed of 1,667 RPM, with and without the bias network, is illustrated. Each figure illustrates the trigger signal level on the vertical axis and the angle position of the engine crankshaft on the horizontal axis. Thus, in FIG. 3 the condition of least and greatest spark advance due to trigger signal noise without the bias control means of the present invention is shown by the interrelationship between the trigger signal trace with respect to the gate voltage trace as the engine operates. The ignition occurs at the start of the two traces, which should be established at a constant advance angle with respect to the peak of the trigger signal as the firing angle reference point. Without the bias circuit, that is, with the bias network 34 replaced by a conductor of zero resistance, the condition of least spark advance as shown by trace 47 occurred at approximately 25 ½° and the condition of greatest spark advance as shown by trace 48 occurred at approximately 35½°. A similar pair of traces 49 and 50 are shown in FIG. 4 for the corresponding speed of 1,667 RPM and with the bias network added. With the bias circuit, the condition of least spark advance as the result of trigger signal noise was 17° and that of the greatest spark advance was approximately 17½°. The spark advance with the bias circuit changed only by approximately ½° while without the bias circuit there is a change of essentially 10°.

The bias circuit produces a substantially negative reference level from which the trigger signal must operate whereas the traces without the bias illustrate operation of the trigger and gate voltages at essentially the zero reference. Similar improvement is noted throughout the operation of the engine. Further the advance is controlled only by the setting of the advance lever and there is essentially no change as the result of the speed of the engine independent from the setting of such lever.

Further, an accompanying benefit obtained by virtue of the substantially negative reference level established by the bias network 34 is a significant improvement in the ability of the circuit to reject unwanted transient voltage signals. The negative bias levels appearing on high frequency by-pass capacitors 43, particularly those connected from gate to cathode of controlled rectifiers 29 and 29' render these controlled rectifiers relatively immune to false triggering from high frequency transient voltages appearing on their anodes. If the bias network 34 is shorted with a conductor of zero resistance such that the bias effect is no longer present, it can be shown that the ignition system is much more likely to produce a crossfiring. For example, if controlled rectifier 11 has been triggered into conduction the stored energy in capacitor 10 is being discharged into pulse transformer 23. At the time that the spark plug associated with coil 23 fires, there is still considerable energy left in capacitor 10 and in capacitor 33'. The firing of the spark plug produces a high amplitude, high frequency transient voltage, which is conducted via wiring and stray circuit capacitances to the anode of the controlled rectifier 29'. As the anode potential of controlled rectifier 29' rises rapidly the internal junction capacitances of controlled rectifier 29'allow a small charging current to flow. If this charging current flows mostly out of the cathode lead 37' to ground wire 31, the connrolled rectifier 29' will react to this charging current as if it were a normal gate triggering current, and be triggered into conduction. This would cause capacitor 33' to discharge its energy into pulse transformer 26', which, in turn, would trigger controlled rectifier 12 into conduction. If there is enough energy remaining in capacitor 10 when controlled rectifier 12 starts conduction, the pulse transformer 23' will cause the other spark plug 5 to fire. If the fresh fuel mixture being drawn into that cylinder is ignited by this undesired spark plug firing, the engine may stop shortly thereafter.

With the negative bias circuit acting normally, the junction capacitance charging current in controlled rectifier 29' flows mostly out of the gate lead 36' into negatively charged capacitor 43 connected to gate 36'. The controlled rectifier 29' will remain in the non-conducting state, and thus appears to be immune to the transient voltage.

The present invention with the variable bias such as provided by the self-bias network modification to the trigger circuit, provides a relatively simple and inexpensive means for stabilizing the ignition timing of capacitor discharge ignition systems wherein the trigger signal varies significantly with the output speed of engine operaton.

Varous modes of carrying out the invention are contemplated as being within the scope of the following claims, particularly pointing out and distinctly claiming the subject matter which is regarded as the invention.

I claim:

1. An ignition system for an internal combustion engine employing a switching means for transferring of energy to a spark plug, said switching means having a threshold switching level, comprising the improvement in the triggering signal source circuit for actuating of said switch means and comprising source means driven in synchronism with said engine and producing an output triggering signal increasing in amplitude with the increasing speed of the engine, a connecting circuit means for interconnecting the output of the source means to the switch means having said threshold switching level and with said increasing amplitude of the output triggering signal being such as to establish an automatic advanced firing of the engine with the increasing speed of the engine, a bias circuit means operatively connected to the source means and to said switch means and establishing a modifying bias signal substantially proportional to the output of the source means and combined with the output of the source to thereby effectively establish a variable bias voltage, said modifying bias signal being essentially matched to the output voltage of the source and combined to continuously oppose the automatic advanced firing angle of the engine with the increasing speed and to maintain a preselected substantially fixed angle for the firing angle for all speeds.

2. The ignition system of claim 1 wherein said bias circuit means includes a capacitor in parallel with a resistance means to establish a relatively low bias voltage at low speed and a relatively high bias voltage at a high speed.

3. The ignition system of claim 1 wherein said source means includes a rotor and stator defining a trigger generator and includes a multiple pole main alternator defining a main voltage source, a capacitor coupled to said alternator and charged to a firing level thereby between generation of trigger signal voltages, a drive shaft, said main alternator and said trigger generator being interconnected to said drive shaft.

4. An ignition system for an internal combustion engine employing a manual firing angle control and a solid state switching means for transferring of energy to a spark plug, comprising the improvement in the triggering signal source circuit for actuating of said switch means and comprising a generator means driven in synchronism with said engine and producing time-spaced output triggering signal voltages having an amplitude proportionally increasing with the increasing speed of the engine, a connecting circuit means for interconnecting the output of said generator means to the switch means, said connecting circuit means including a self-bias circuit means connected in series with the input of the switch means and the output of the generator between the generator and said switch means combined therewith to form a threshold switching level signal, said bias circuit means establishing a back biasing voltage opposing the output triggering signal voltage on said switch means and said back biasing voltage being substantially proportional to the output of the generator to control the threshold switching level signal and thereby establishing a variable threshold voltage essentially matched to the output voltage of the generator to prevent significant automatic advance of the timing with increasing speed as the result of the increase in amplitude of the output triggering signal voltage with the increasing speed.

5. The system of claim 4 wherein said bias circuit includes a capacitor in parallel with a relatively slow discharge means for resetting of the capacitor between trigger voltage signals to establish a relatively low bias voltage at low speed and a relatively high bias voltage at a high speed.

6. The ignition system of claim 5 including a multiple pole alternator defining a voltage source, a capacitor coupled to said alternator and charged to a firing level thereby between generation of triggering signal voltages, a drive shaft driven by said engine, said main alternator and said trigger generator being interconnected to said drive shaft.

7. An ignition system for energizing an internal combustion engine, a power supply means, a triggered switch means connected to the power supply means for delivering the ignition impulses and having a selected input threshold firing voltage, and a means actuating said triggered switch means and comprising a generator driven in synchronism with said engine and having a control means for adjusting the timing output and having an output, said generator related to the engine speed defining a variable trigger signal, said output increasing in level with increasing speed of the engine, a triggering circuit having output means adapted to be connected as the input to the triggered switch means and including a variable threshold voltage means approximately corresponding to the variation in the trigger signal and increasing in level with increasing speed of the engine, said variable threshold voltage means being connected in circuit to said generator to continuously oppose the variable trigger signal and establish an opposing signal directly related to the output of the generator which essentially eliminates variations in the firing angle of the triggered switch means with the speed of rotation of the generator and thereby maintains a selected firing angle which is essentially constant with the changes in the speed of the engine and the generator.

8. The ignition system of claim 7 wherein said power supply means includes a capacitor connected in circuit with and controlled by said triggering switch means, said switching means being a solid state gated device having a selected triggering threshold voltage.

9. The ignition system of claim 7 wherein said means activating said triggered switch means includes a single triggering coil the opposite ends of which are connected respectively to the gates of a pair of gated solid state controlled rectifiers forming said triggered switch means, a common ground lead connected to and in common to the cathodes of said controlled rectifiers, said bias network including a bias capacitor having one side connected to the ground lead, a pair of back-to-back diodes having the anodes connected in common to the second side of said bias capacitor and having the opposite cathodes of the diodes connected respectively to the opposite ends of said coil.

10. The ignition system of claim 9 including main circuit controller rectifiers connecting a main firing capacitor to the respective spark plugs, a pair of pulse forming networks including a trigger capacitor connected to the generator and connected between the main firing capacitor and an auxiliary controlled rectifier, said pair of pulse forming networks being respectively connected one each to the gate to cathode circuits of the main firing controlled rectifiers.

11. The ignition system of claim 7 wherein the internal combustion engine is a two cylinder unit having a pair of cylinders with an individual spark plug for each cylinder and said power supply means includes a common firing capacitor for both of said spark plugs, said switching means including individual solid state controlled rectifiers, said triggering circuit including a single triggering coil the opposite ends of which are connected respectively to the gates of said controlled rectifiers, a common ground lead connected to and in common to the cathodes of said controlled rectifiers, said bias network including a bias capacitor having one side connected to the ground lead, a pair of back-to-back diodes having the anodes connected in common to the second side of said bias capacitor and having the cathodes of the diodes connected respectively to the opposite ends of said coil.

12. The ignition system of claim 11 including main circuit controlled rectifiers connecting said capacitor to the respective spark plugs, a pair of pulse forming networks including a trigger capacitor connected to the generator and an auxiliary controlled rectifier, said pair of pulse forming networks being respectively connected one each to the gate to cathode circuits of the main circuit controlled rectifiers.

13. The ignition system of claim 7 wherein said generator is driven from a two cylinder alternate firing engine, a rotating support coupled to the engine, said generator including a rotor connected to said support and including a pair of permanent magnets mounted diametrically in opposed portions of the support, said magnets being oppositely polarized, a single winding disposed adjacent to the path of said magnets and coupled to the field of the passing magnets such that each magnet establishes a unidirectional magnetic field through said winding means to fire the cylinders in selected alternate sequence without a distributor.

14. The ignition system of claim 1 wherein said source means is a generator driven from a two cylinder alternate firing engine having a flywheel, said flywheel including a rotor connected to said flywheel and including a pair of permanent magnets mounted diametrically in opposed portions of the flywheel, said magnets being oppositely polarized, a single winding disposed adjacent to the path of said magnets and coupled to the field of the passing magnets such that each magnet establishes a unidirectional magnetic field through said winding means to fire the cylinders in selected alternate sequence without a distributor.

* * * * *

UNITED STATES PATENT OFFICE
CERTIFICATE OF CORRECTION

Patent No. 3,805,759     Dated April 23, 1974

Inventor(s) ARTHUR O. FITZNER

It is certified that error appears in the above-identified patent and that said Letters Patent are hereby corrected as shown below:

Column 1, Line 27, at the beginning of the line cancel "gerig" and insert --- gering ---;

Column 2, Line 10, at the beginning of the line cancel "thougb" and insert --- though ---;

Line 11, before "combination" cancel "tbe" and insert --- the;

Column 3, Line 26, after "drawing" cancel "anc" and insert --- and ---;

Column 5, Line 30, cancel "tbe" and insert --- the ---;

Line 57, at the beginning of the line cancel "tbe" and insert --- the ---;

Column 7, Line 19, cancel "connrolled" and insert --- controlled ---;

Line 45, cancel "Varous" and insert --- Various ---;

Column 8, Line 6, after "fixed" cancel "angle for the";
(Claim 1)

-1-

UNITED STATES PATENT OFFICE
CERTIFICATE OF CORRECTION

Patent No. 3,805,759   Dated April 23, 1974

Inventor(s) ARTHUR O. FITZNER

It is certified that error appears in the above-identified patent and that said Letters Patent are hereby corrected as shown below:

Column 9, Line 1, after "output" (first occurrence) cancel "and" and insert --- , said generator ---; and after "output" (second occurrence) cancel "said generator";
(Claim 7)

Column 9, Line 22, cancel "triggering" and insert --- triggered ---;
Claim 8)

Line 23, cancel "switching" and insert --- triggered switch ---;

Signed and sealed this 1st day of October 1974.

(SEAL)
Attest:

McCOY M. GIBSON JR.
Attesting Officer

C. MARSHALL DANN
Commissioner of Patents

-2-